United States Patent [19]
Hamaekers et al.

[11] Patent Number: 5,092,565
[45] Date of Patent: Mar. 3, 1992

[54] HYDRAULICALLY DAMPED RUBBER CARTRIDGE SPRING

[75] Inventors: Arno Hamaekers, Gorxheimertal; Axel Rudolph, Darmstadt, both of Fed. Rep. of Germany

[73] Assignee: Firma Carl Freudenberg, Weinheim/Bergstrasse, Fed. Rep. of Germany

[21] Appl. No.: 561,156

[22] Filed: Aug. 1, 1990

[30] Foreign Application Priority Data

Nov. 2, 1988 [DE] Fed. Rep. of Germany ....... 3936347

[51] Int. Cl.$^5$ .............................................. F16M 1/02
[52] U.S. Cl. .............................. 267/140.1 C; 248/562; 248/636
[58] Field of Search ............... 248/559, 562, 635, 636, 248/638; 267/35, 140.1 AE, 140.1 C, 140.1 E, 141.2, 141.3, 141.4, 141.5, 219, 141.6, 141.7, 293; 92/162 R

[56] References Cited

U.S. PATENT DOCUMENTS 4,822,010 4/1989 Thorn .............................. 267/140.1

FOREIGN PATENT DOCUMENTS 0009120 4/1980 European Pat. Off. .
0072747 4/1983 Japan ................................. 267/293

*Primary Examiner*—Robert J. Oberleitner
*Assistant Examiner*—Chris Schwartz
*Attorney, Agent, or Firm*—Sprung Horn Kramer & Woods

[57] ABSTRACT

A hydraulically damped rubber cartridge spring incorporates two chamber pairs (4, 6; 5, 7) isolated from one another by a wall (8). The chambers are located at a distance from one another in the direction of the introduced vibrations. The chambers of each chamber pair are connected by damping orifices (9, 10) of a channel-like configuration. The damping orifices (9, 10) are so dimensioned and coordinated with the bulge elasticity of the corresponding walls (11) of the bilaternally adjoining chambers, that the contained liquid mass enters into a resonant motion if the vibrations introduced by the spring's operation differ from one another in frequency. The dividing wall (8) contacts the external sleeve (1) loosely when vibrations are not introduced, and at the same time is resiliently deformed toward the internal tube (2) by the external sleeve (1).

4 Claims, 3 Drawing Sheets

HYDRAULICALLY DAMPED RUBBER CARTRIDGE SPRING

BACKGROUND OF THE INVENTION

The invention relates to a hydraulically damped rubber cartridge spring of the type comprising an external sleeve and an internal tube which are supported, one on the other, by an elastomeric (e.g., rubber) spring body. At least two liquid-filled pairs of chambers are provided in the spring body, spaced apart in the direction of the introduced vibrations by a flexible dividing wall. The chambers of each pair are connected to one another by a damping orifice having a channel-like configuration.

A rubber cartridge spring of this type is disclosed in European patent application No. 0 009 120. It has a damping action only in a narrowly defined frequency range. Also, its useful life is not very satisfactory, especially due to the occurrence of cracks in the dividing wall which extend transversely of the direction of the vibrations introduced during practical operation. The presence of such cracks put an end to the damping action of the device.

SUMMARY OF THE INVENTION

A principal object of the present invention is to develop a rubber cartridge spring of the type referred to above which assures good effectiveness over long periods of time in the damping of introduced vibrations over a decidedly wider frequency range.

This object, as well as other objects which will become apparent from the discussion that follows, are achieved, in accordance with the present invention, by so dimensioning and adapting the damping orifices to the summed bulge elasticities of the walls of the bilaterally adjoining chambers that the contained liquid mass enters into a resonant motion, and so dimensioning and adapting the dividing wall that it loosely contacts the outer sleeve when vibrations are not introduced, and is resiliently deformed in the direction of the inner tube by the outer sleeve.

The rubber cartridge spring in accordance with the invention is stressed transversely of the length of the tube and sleeve and the damping orifices are so dimensioned and adapted to the bulge elasticities of the walls of the chambers adjoining on both sides that the mass of liquid contained in them will enter into a resonant motion if the frequency of the introduced vibrations differs from one to the other.

The rubber cartridge spring thus has two damping maxima and a corresponding damping effectiveness in two ranges. Depending on how they are made, these ranges can be so close together that their damping action merges to result in an especially large frequency range or they can be at such a distance apart that the result will be a good damping action in two ranges of frequency to deal with vibrations which are especially undesirable and require damping.

The boundary conditions of the tuning to be performed are known to persons skilled in the art. They are effected based on the formula $$\omega_o = \sqrt{\frac{c}{m}}$$

wherein $\omega_o$ describes the resonant frequency of the liquid mass contained in the damping orifice, m the mass of the liquid, and c the total bulge elasticity of the flexible walls of each pair of chambers. The resonant frequency $\omega_o$ is to correspond as closely as possible to the frequency of the vibrations introduced in operation which manifest themselves in an especially undesirable manner, and which require damping. It can assume different values depending upon the particular application.

When vibrations are not being introduced, the dividing wall lies sealingly but loosely against the inner wall of the external sleeve, being resiliently deformed by the external sleeve toward the internal tube. If vibrations of an ordinary magnitude are introduced, the sealing contact with the external sleeve undergoes no change, so that the above-mentioned damping effectiveness is fully preserved.

Upon the introduction of vibrations into the rubber cartridge spring which result in extremely great relative displacements of the internal tube with respect to the external sleeve, the portion of the dividing wall ahead of the internal tube in the direction of its yielding movement undergoes a still greater deformation and sealing contact pressure than before, while the opposite portion of the dividing wall lifts away from the inner side of the external sleeve and opens a gap between the chambers adjoining on both sides. The bulge elasticities of the walls of the chambers, which are to be inserted, in sum, in accordance with the formula $$\frac{1}{C_{tot}} = \frac{1}{C_1} + \frac{1}{C_2}$$

and which enter into the liquid masses contained in the damping orifices, thereby undergo a change, which would result in a relative displacement of the particular damping maximum. Such a displacement, however, can generally easily be accepted in view of the damping action that continues to be assured, with a view toward preventing tension cracks in the dividing wall. It can be completely prevented if the bulge elasticities of all chambers are of the same magnitude and the damping orifices are sized differently from one another for the above-described achievement of different resonant frequencies.

The dividing wall can have an arcuate profile in the deformation area in contact with the outside wall, bulging transversely to the direction of the vibrations introduced in operation.

Vertical upsetting stresses on the dividing wall and mechanical overstress during the introduction of vibrations can be prevented in this manner, which promotes the attainment of a long useful life.

It has proven to be especially desirable for the dividing wall to contact the external sleeve with a sealing lip, preferably with one which displaceably contacts the external sleeve transversely to the direction of the introduced working vibrations.

By assuring a good sealing of the adjoining chambers on both sides under normal operating conditions, the occurrence of upsetting tensions in the dividing wall is advantageously prevented.

The resilient deformation of the dividing wall produced in the dividing wall by contact with the external sleeve can, when vibrations are not being introduced, be less than the maximum deflection of the internal tube with respect to the external sleeve. In the case of extreme excursions, this results in a gap connecting the adjoining chambers, which brings about a pressure equalization and assures a uniform loading of the rubber cartridge springs in all areas during their normal use.

The preferred embodiment of the present invention will now be described with reference to the accompanying drawings.

DESCRIPTION OF THE PREFERRED EMBODIMENT

Figure 1:
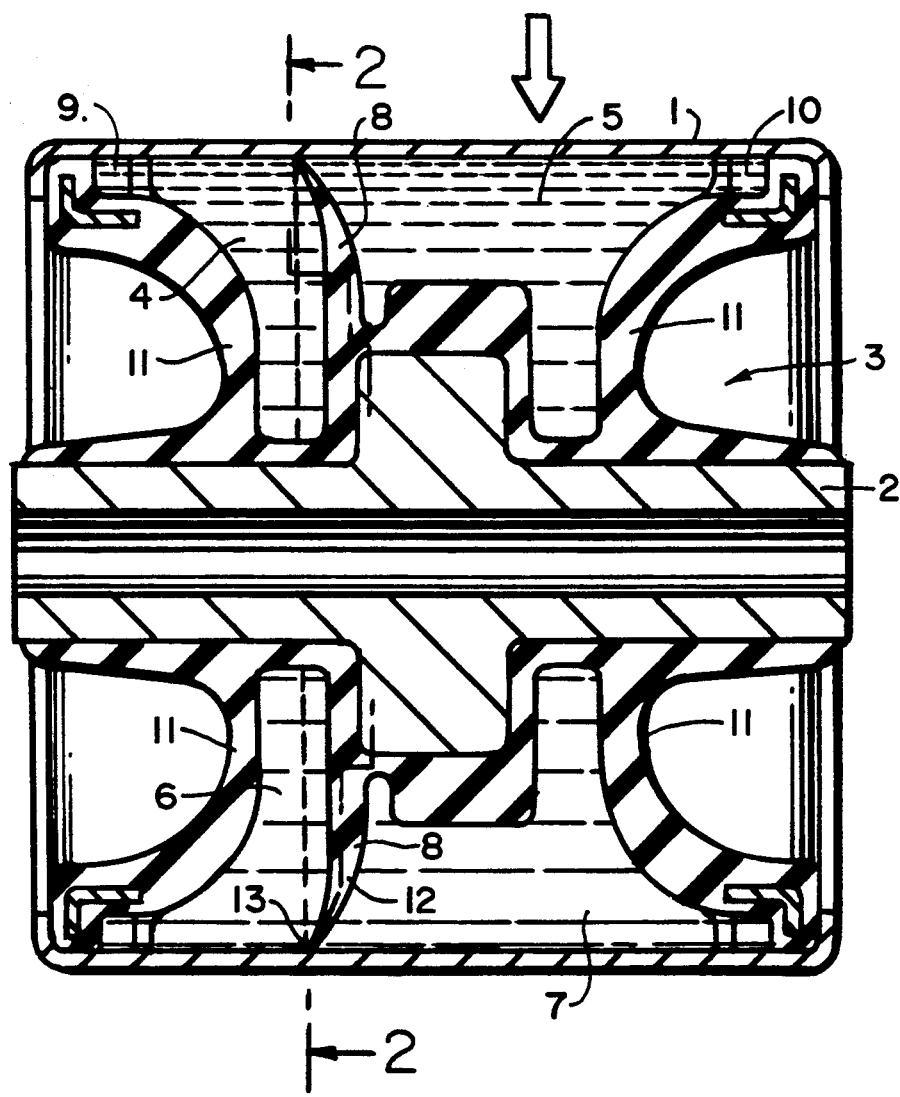
FIG. 1 is a longitudinal section of a rubber cartridge spring according to the preferred embodiment of the present invention.
Figure 2:
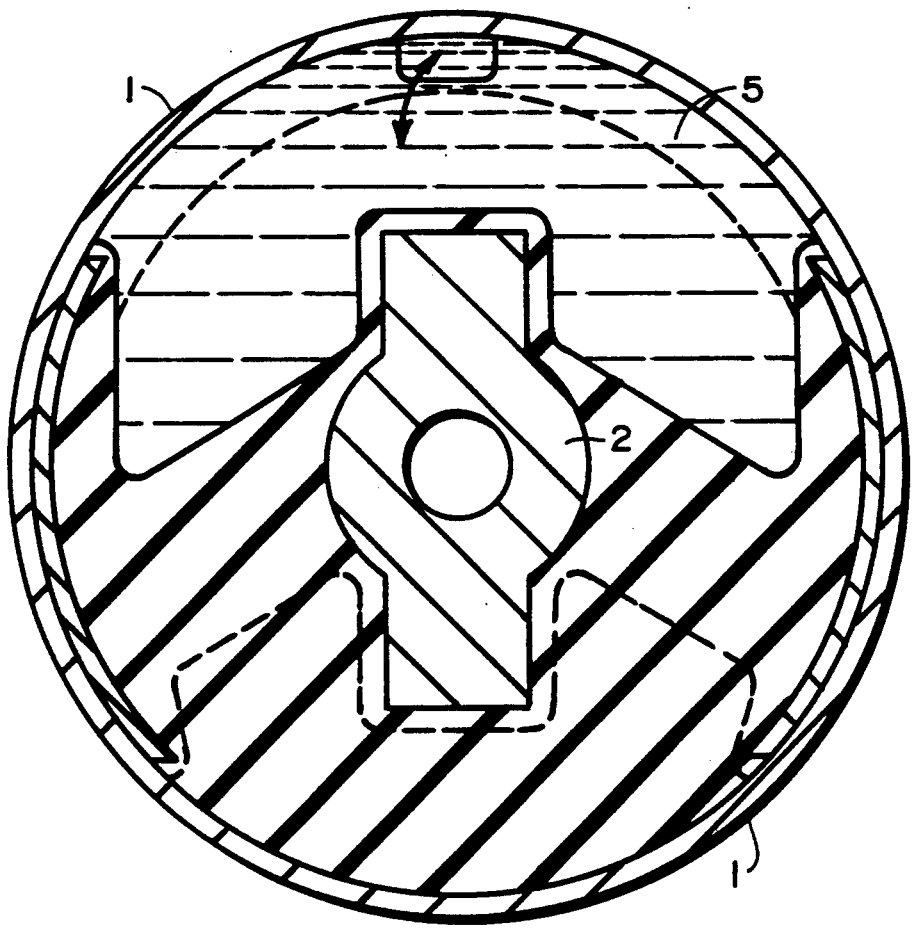
FIG. 2 shows the rubber cartridge spring of FIG. 1 in a cross section on line A—A.
Figure 3:
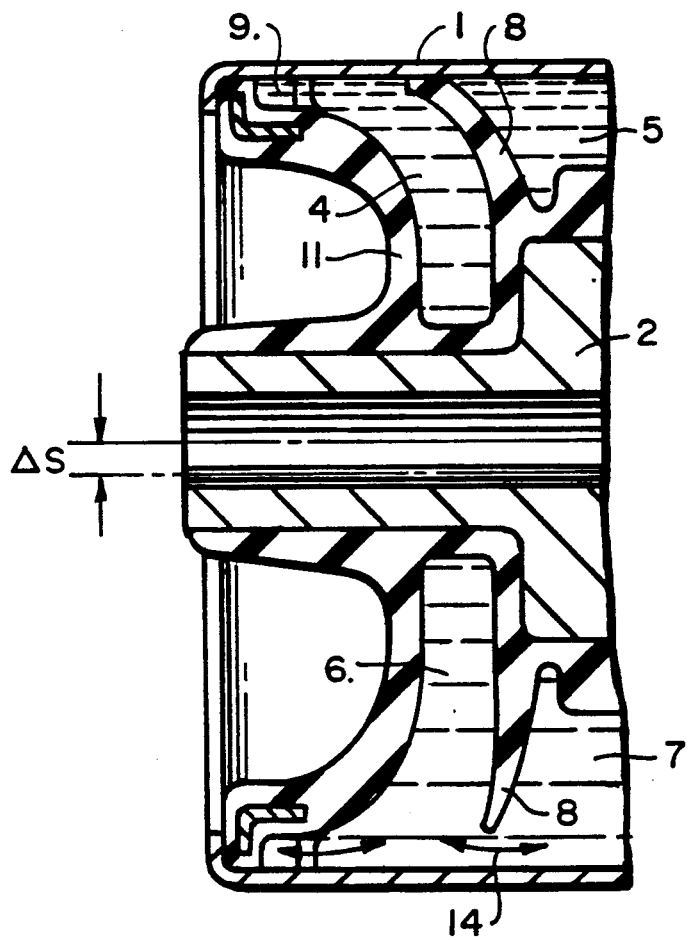
FIG. 3 is a fragmentary longitudinal cross section of the rubber cartridge spring of FIG. 1 upon the occurrence of an extreme deflection of the internal tube with respect to the external sleeve.

The rubber cartridge spring represented in FIGS. 1-3 of the drawings includes an external sleeve 1 and an internal tube 2, respectively, which are supported one on the other by a rubber-elastic spring body 3. Two liquid-filled pairs of chambers 4, 6 and 5, 7 are provided in the spring body 3. The chamber pairs are isolated from one another, in the direction of the vibrations introduced during operation as indicated by the outlined arrow, by means of a flexible dividing wall 8. The chambers 4, 5, 6 and 7 of each chamber pair 4, 6 and 5, 7 are connected together by a damping passage 9 and 10, respectively, of channel-like configuration. The two damping passages 9 and 10 are of such dimensions and are adapted to the sum of the bulge elasticities of the walls 11 of the adjacent chambers 4, 5, 6, 7 such that the liquid masses they contain will come into resonant movement in the case of different frequencies of the introduced vibrations. The dividing, wall 8 forms an integral component of the rubber-elastic spring body 3 and, like the latter, it is joined to the internal tube 2 by direct vulcanization. A sealing lip 12 of the dividing wall 8 lies sealingly yet loosely against the inside of the external sleeve 1 to provide a seal at 13 when vibrations are not introduced, being resiliently deformed toward the internal tube by the external sleeve. In the event of deflections of the internal tube 2 with respect to the external sleeve tube 1 by any amount, tension is not produced in any part of the dividing wall 8. This prevents the occurrence of tension cracking in the dividing wall.

That portion of the dividing wall 8 which is situated ahead of the internal tube 2, in the direction of relative displacement of the internal tube 2 with respect to the external sleeve 1 in the course of operation, will in such a case undergo an elastic deformation and shortening in the stated direction.

The mutual isolation of the two adjacent chambers is not changed by this, thereby maintaining the independent damping action of the damping orifices 9 and 10.

The situation in this regard remains unchanged when the deflections of the internal tube 2 with respect to the external sleeve 1 have an amplitude that is smaller than the deformation of the dividing wall 8 by the external sleeve 1. In this case a sealing contact is still maintained between the dividing wall 8 and the inside of the external sleeve 1, even on the side of the dividing wall 8 that is opposite the section described above.

A change will not occur in these conditions until the relative displacement of the internal tube 2 with respect to the external sleeve 1 reaches an amplitude which is greater than that produced in the vibration-free state by the resilient deformation of the dividing wall 8 produced by the outer tube. Then the dividing wall 8 will be lifted away from the inside of the external sleeve 1 on the side opposite the direction of the relative movement of the internal tube 2, and thus a liquid-carrying passage will be formed between the two adjacent chambers 4 and 5. If the chambers 4 and 5 are defined in the axial direction by walls 11 which have different bulge elasticities, the result in this case will be a change in the resonant frequency of the liquid masses contained in the damping orifices 9 and 10. If, however, the defining walls 11 are of the same bulge elasticity and the damping orifices 9 and 10 are configured differently from one another, then even in this case the originally given resonant frequency of the liquid masses contained in the two damping orifices 9 and 10 will be preserved, and the result will be no change in the damping effectiveness.

Since the danger of the occurrence of tension cracks in the dividing wall 8 is eliminated, the latter will advantageously undergo no alteration even in use over a long period of time.

The occurrence of an extreme movement of the internal tube 2 with respect to the external sleeve 1 is indicated graphically in FIG. 3. The deflecting movement itself is identified by Δs and the resulting gap between the chambers 6 and 7 adjoining the dividing wall 8 is indicated at 14. There has thus been shown and described a novel hydraulically damped rubber cartridge spring which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is to be limited only by the claims which follow.

What is claimed is:

1. In a hydraulically damped rubber cartridge spring, comprising an external sleeve and an internal tube which are supported, one on the other, by a elastomeric spring body, said internal tube being movable radially with respect to said external sleeve, wherein at least two liquid-filled pairs of chambers are provided in the spring body spaced apart in the direction of the introduced vibrations by a flexible dividing wall, with at least one wall of each chamber providing a bulging elasticity, chambers of each pair being connected to one another by a damping orifice being shaped as a channel means, the improvement wherein the damping orifices are each so dimensioned and configured to the summed bulge elasticities of the chamber walls of the bilaterally adjoining chambers that the contained liquid enters into a resonant motion, and wherein the dividing wall loosely contacts the external sleeve when vibrations are not introduced, and is resiliently deformed by the external sleeve in the direction of the internal tube when the external sleeve and internal tube are caused to move toward each other.

2. The rubber cartridge spring according to claim 1, wherein the dividing wall has an arcuate profile in the area of its deformation.

3. The rubber cartridge spring according to claim 1, wherein the dividing wall contacts the external sleeve with a sealing lip.

4. The rubber cartridge spring according to claim 1, wherein the deformation of the dividing wall is smaller than the maximum deflectability of the internal tube with respect to the external sleeve.

* * * * *